(12) United States Patent
Kim et al.

(10) Patent No.: US 7,547,857 B2
(45) Date of Patent: Jun. 16, 2009

(54) KEYPAD ASSEMBLY FOR PORTABLE TERMINAL

(75) Inventors: Sang-Yul Kim, Suwon-si (KR); Bum-Lai Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/616,067

(22) Filed: Dec. 26, 2006

(65) Prior Publication Data

US 2007/0246341 A1    Oct. 25, 2007

(30) Foreign Application Priority Data

Apr. 25, 2006    (KR) ...................... 10-2006-0037158

(51) Int. Cl.
*H01H 13/14*    (2006.01)
(52) U.S. Cl. ...................... 200/520; 200/5 A
(58) Field of Classification Search ............. 200/520
See application file for complete search history.

(56) References Cited

U.S. PATENT DOCUMENTS

| | | | | |
|---|---|---|---|---|
| 5,294,758 | A * | 3/1994 | Frankhouse et al. | 200/5 R |
| 6,437,682 | B1 * | 8/2002 | Vance | 338/185 |
| 6,670,893 | B1 * | 12/2003 | Svarfvar | 341/22 |
| 6,680,676 | B1 * | 1/2004 | Hayashi et al. | 341/22 |
| 6,744,890 | B1 * | 6/2004 | Le et al. | 379/433.07 |
| 7,067,757 | B1 * | 6/2006 | Chadha | 200/512 |
| 7,252,444 | B2 * | 8/2007 | Ladouceur | 400/472 |

FOREIGN PATENT DOCUMENTS

JP    2000-285767    10/2000

* cited by examiner

*Primary Examiner*—Elvin G Enad
*Assistant Examiner*—Lheiren Mae A Anglo
(74) *Attorney, Agent, or Firm*—H.C. Park & Associates, PLC

(57) ABSTRACT

A keypad assembly for a portable terminal includes a first keypad assembly including a substrate formed with openings, and a second keypad assembly including a stick which extends through the substrate. The stick is substantially coplanar with keys on the first keypad.

17 Claims, 8 Drawing Sheets

KEYPAD ASSEMBLY FOR PORTABLE TERMINAL

CROSS REFERENCE TO RELATED APPLICATION

This application claims priority from and the benefit of Korean Patent Application No. 10-2006-0037158, filed on Apr. 25, 2006, which is hereby incorporated by reference for all purposes as if fully set forth herein.

BACKGROUND OF THE INVENTION

1. Field of the Invention

The present invention relates to a keypad assembly of a portable terminal, and more particularly to a portable terminal keypad assembly that includes a joystick that does not protrude out of the keypad assembly, so that a user can click the joystick.

2. Discussion of the Background

Generally, a "portable terminal" refers to a portable electronic device used for wireless communication such as Digital Multimedia Broadcasting (DMB) phones, game phones, chatting phones, camera phones, MP3 phones, cellular phones, Personal Communication System (PCS), Personal Digital Assistants (PDAs), Hand-Held Phones (HHPs), and the like. Considering portability, design of such portable terminals has tended not only toward compactness, slimness and lightness, but also toward providing multimedia capabilities to allow the user to pursue more functions. In particular, future portable terminals will not only be used for many functions while still being compact and light, but they will also be suitable for functioning in a multimedia environment and for providing internet access and functions. Additionally, portable terminals may now allow high-speed data communication, as well as voice communication. That is, with increasing consumer demands, various services have been provided using wireless communication technology to transmit and receive data at a high speed.

Conventional portable terminals typically include a data input/output unit, a speaker, a microphone, and an antenna, etc. A keypad assembly, which has a plurality of keys, may be used as the data input unit, and a liquid crystal display unit may be used as the data output unit. Generally, keys are pressed to input desired data with the known keypad assembly. The display unit displays an operating state of the portable terminal such as electric wave reception intensity, battery charge status, weather, time, and phone numbers input by a user.

FIG. 1 shows a configuration of a conventional keypad assembly 50 that may be used in a portable terminal. As FIG. 1 shows, a plurality of keys 52 is attached to a flexible pad 51. A substrate 53 is disposed on a lower surface of the flexible pad 51 while facing the flexible pad 51. Actuators 54 are disposed on the lower surface of the flexible pad 51 at positions corresponding to the keys 52. Metal domes 55 are disposed on the surface of the substrate 53 that faces the actuators. With this configuration, when a user presses the selected key 52 down, the actuator 54 presses the metal dome 55 down so that a signal may be applied. Once the downward force applied to the key 52 is removed, the key 52 and the metal dome 55 return to their initial positions.

A multimedia environment that provides various contents requires a variety of input devices. Specifically, a joystick, particularly an optical joystick, may be necessary for users to conveniently input various contents.

However, if an input unit such as a joystick is adapted to the portable terminal, the joystick should be disposed among the keys of the conventional keypad assembly. In this case, the joystick may protrude over the keypad assembly keys because it is taller than the keys. This, however, detracts from the portable terminal's appearance. Additionally, if the joystick protrudes above the keys, it is inconvenient for a user to operate the keypad and carry the portable terminal. Also, the possibility of joystick malfunction may increase.

SUMMARY OF THE INVENTION

The present invention provides a configuration of the joystick key in which the upper end of the joystick is located substantially coplanar with the other keys in the state that the joystick key and the other keys are in combination with each other.

The present invention provides a keypad assembly for a portable terminal, in which a key functioning as a joystick is in combination with the other keys and located substantially coplanar with the other keys, thereby providing a glossy appearance and useful design.

The present invention also provides a keypad assembly that includes one key functioning as a joystick and arranged substantially coplanar with other keys, thereby providing glossy appearance and improving the portability of the portable terminal and preventing joystick malfunction.

Additional features of the invention will be set forth in the description which follows, and in part will be apparent from the description, or may be learned by practice of the invention.

The present invention discloses a keypad assembly that includes a first keypad assembly including a substrate and a second keypad assembly including a stick that extends through the substrate.

The present invention also discloses a keypad assembly that includes a first keypad assembly including a first substrate having a first opening, and a second keypad assembly including a second substrate and a stick. The stick is disposed on the second substrate, and it extends through the first opening. The second substrate is disposed on a lower surface of the first substrate.

The present invention also discloses a keypad assembly for a portable terminal. The keypad assembly includes a first printed circuit board, a plurality of first metal domes convexly protruding upward from an upper surface of the first printed circuit board, and a first keypad having a plurality of keys arranged on an upper surface of the first keypad. A first actuator is disposed on a lower surface of the first keypad while facing the first metal domes. A second printed circuit board is disposed on a lower surface of the first printed circuit board, a second metal dome convexly protrudes downward from a lower surface of the second printed circuit board, and a housing has a second actuator that is disposed on an upper surface of the housing so as to face the second metal dome. The housing is disposed on the first printed circuit board so as to substantially cover the second printed circuit board. A stick is disposed on the second printed circuit board, and it extends through the first printed circuit board to be adjacent to the keys.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
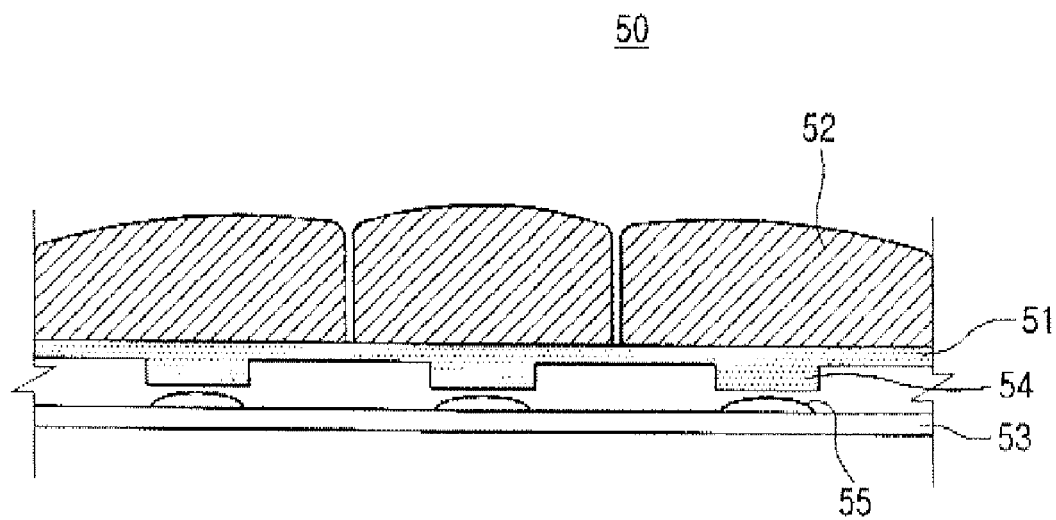
FIG. 1 is a sectional view showing a conventional keypad assembly for a portable terminal.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
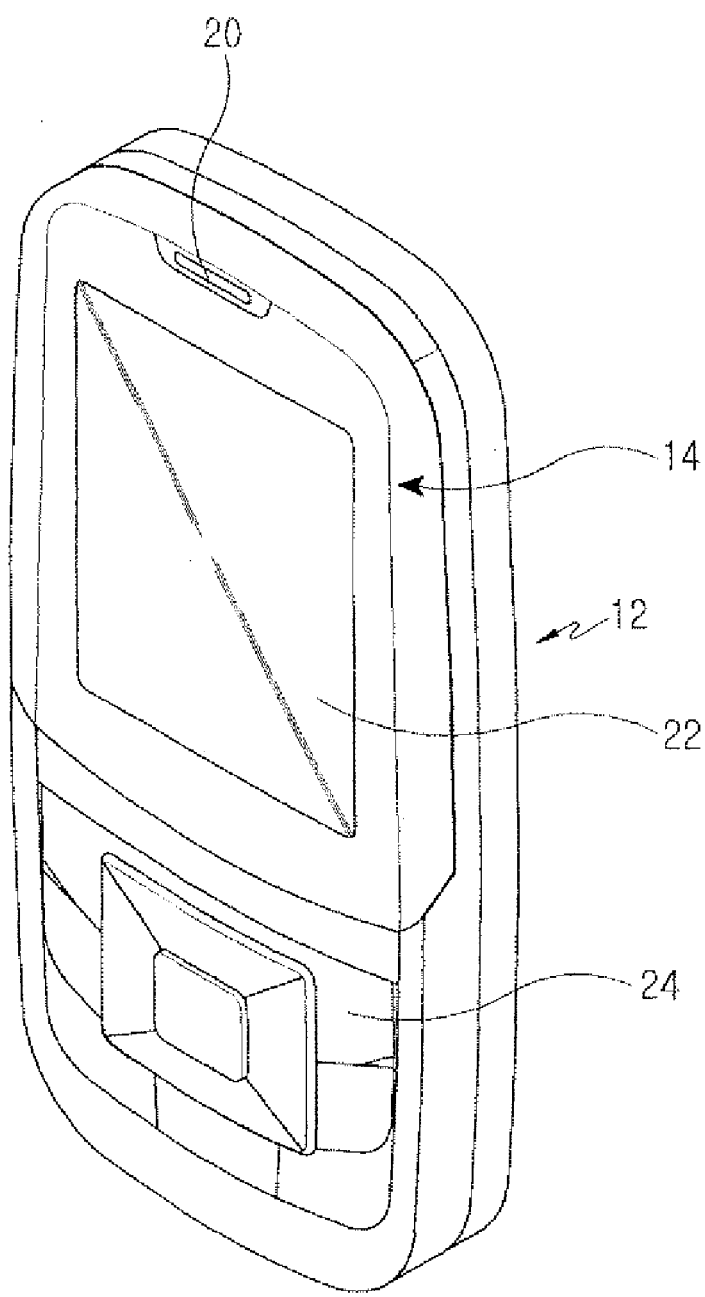
FIG. 2 is a perspective view showing a sliding type portable terminal to which a keypad assembly according to an exemplary embodiment of the present invention may be adapted.
Figure 3:
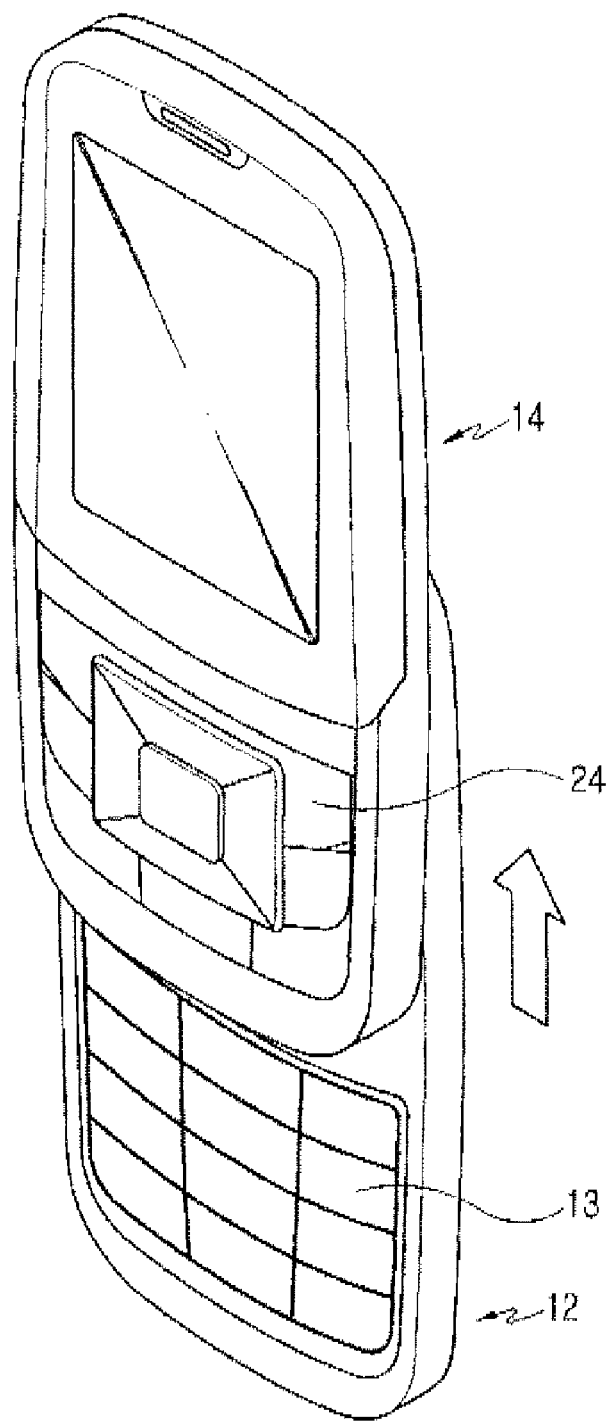
FIG. 3 is a perspective view showing the sliding type portable terminal of FIG. 2 with a sliding housing open.

FIG. 2 and FIG. 3 show a portable terminal 10 having a keypad assembly adapted thereto according to an exemplary embodiment of the present invention. As shown in FIG. 2 and FIG. 3, the portable terminal 10 is a sliding type portable terminal, which includes a body housing 12 and a sliding housing 14. The sliding housing 14 is restricted and moves on the body housing 12 by means of a sliding module (not shown). FIG. 2 shows the sliding housing 14 being closed with respect to the body housing 12, and FIG. 3 shows the sliding housing 14 being open with respect to the body housing 12. The sliding housing 14 has a speaker unit 20, a display unit 22, and a keypad assembly 24, which includes an array of keys. The body housing 12 has another keypad assembly 13 that includes an array of keys. The keypad assembly 13 of the body housing 12 is either exposed or covered according to the position of the sliding housing 14.

The configuration of the keypad assembly 24 disposed on the sliding housing 14 will be described in detail below. The keypad assembly 24 includes a first keypad assembly, which includes keys that are pressed to input desired data, and a second keypad assembly, which includes a stick key. Both the first and second keypad assemblies may be used to easily input desired data.

As shown in FIG. 4, FIG. 5, FIG. 6, and FIG. 7, a keypad assembly according to an exemplary embodiment of the present invention includes a first keypad assembly having openings 115 and 215 with a desired shape, and a second keypad assembly inserted into the openings 115 and 215 of the first keypad assembly. The first keypad assembly includes a first keypad 100 and a first substrate 200 arranged on a lower surface of the first keypad 100 while facing the first keypad 100. The first keypad 100 includes a flexible pad 110, which has a first actuator 112 protruding from a lower surface thereof, and a plurality of keys 120 arranged on the flexible pad 110. The upper surface of the keys 120 is exposed from a case of the sliding housing of the portable terminal. The flexible pad 110 and the keys 120 may be integrally formed.

Figure 8:
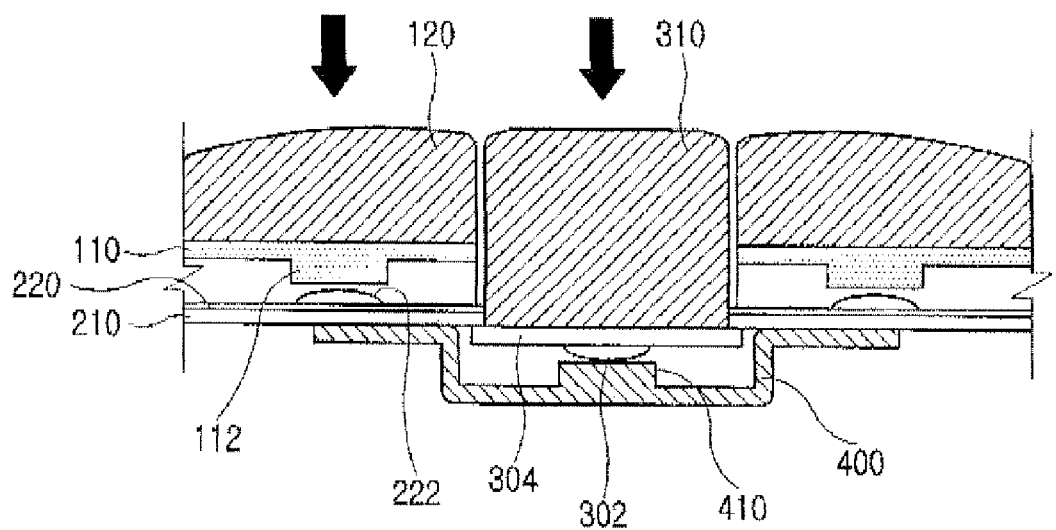
FIG. 8 is a sectional view showing a configuration of the keypad assembly according to an exemplary embodiment of the present invention.

The first actuators 112 may be integrally formed with the flexible pad 110 so as to protrude downwardly from a surface of the flexible pad 110, and they may have a cylindrical shape. They may have other different shapes than a cylindrical shape. Here, the first actuators 112 are formed at positions corresponding to the keys 120. Each key 120 is coupled with the flexible pad 110. The first substrate 200 includes a first printed circuit board 210 and a dome sheet 220 disposed on the first printed circuit board 210. The dome sheet 220 includes a plurality of first metal domes 222 that are coupled with the first printed circuit board 210 by means of the dome sheet 220. Thus, as FIG. 8 shows, the first actuator 112 faces, and is spaced a predetermined distance apart from, the first metal domes 222. When a user pushes an upper end of a selected key 120, the first actuator 112 forces the first metal dome 222 located under the key 120 down, thereby causing the first metal dome 222 to contact with a contact point (not shown) on the first printed circuit board 210 so as to input a signal. On the other hand, when the force applied to the upper end of the key 120 is removed, the key 120 returns to its initial position by elasticity of the flexible pad 110 and the first metal dome 222.

Figure 4:
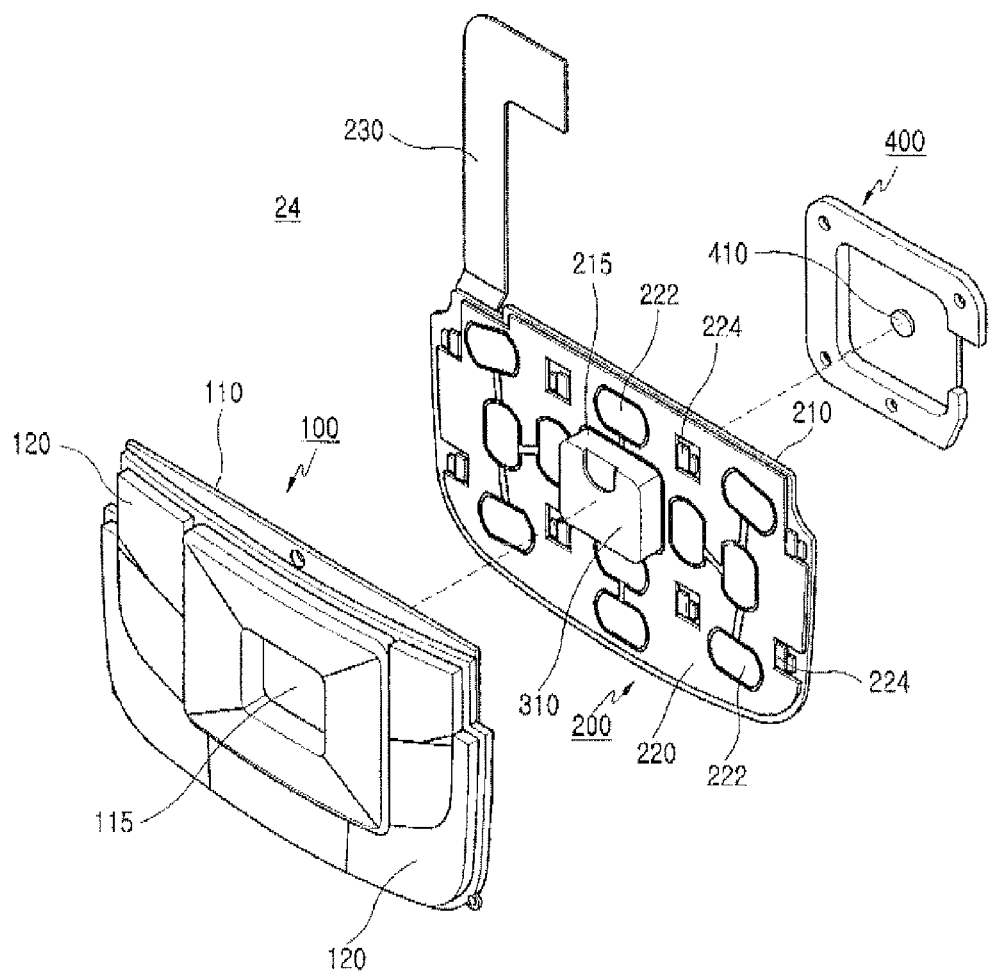
FIG. 4 is an exploded perspective view showing the configuration of a keypad assembly according to an exemplary embodiment of the present invention viewed from an upper portion of the keypad assembly.

As shown in FIG. 4, a light source 224, particularly a light emitting diode, is disposed between the keys 120 in order to emit light. The first printed circuit board 210 is electrically connected to a main board (not shown) through a first flexible circuit 230.

The openings formed in the first keypad assembly include the first opening 115, which is formed in the first keypad 100, and the second opening 215, which is formed in the first substrate 200. The first and second openings 115 and 215 correspond with each other, and a stick 310 of the second keypad assembly extends through the first and second openings 115 and 215. As FIG. 8 shows, the stick 310 may be arranged so that its upper surface and the upper surface of the keys 120 are substantially coplanar.

Figure 5:
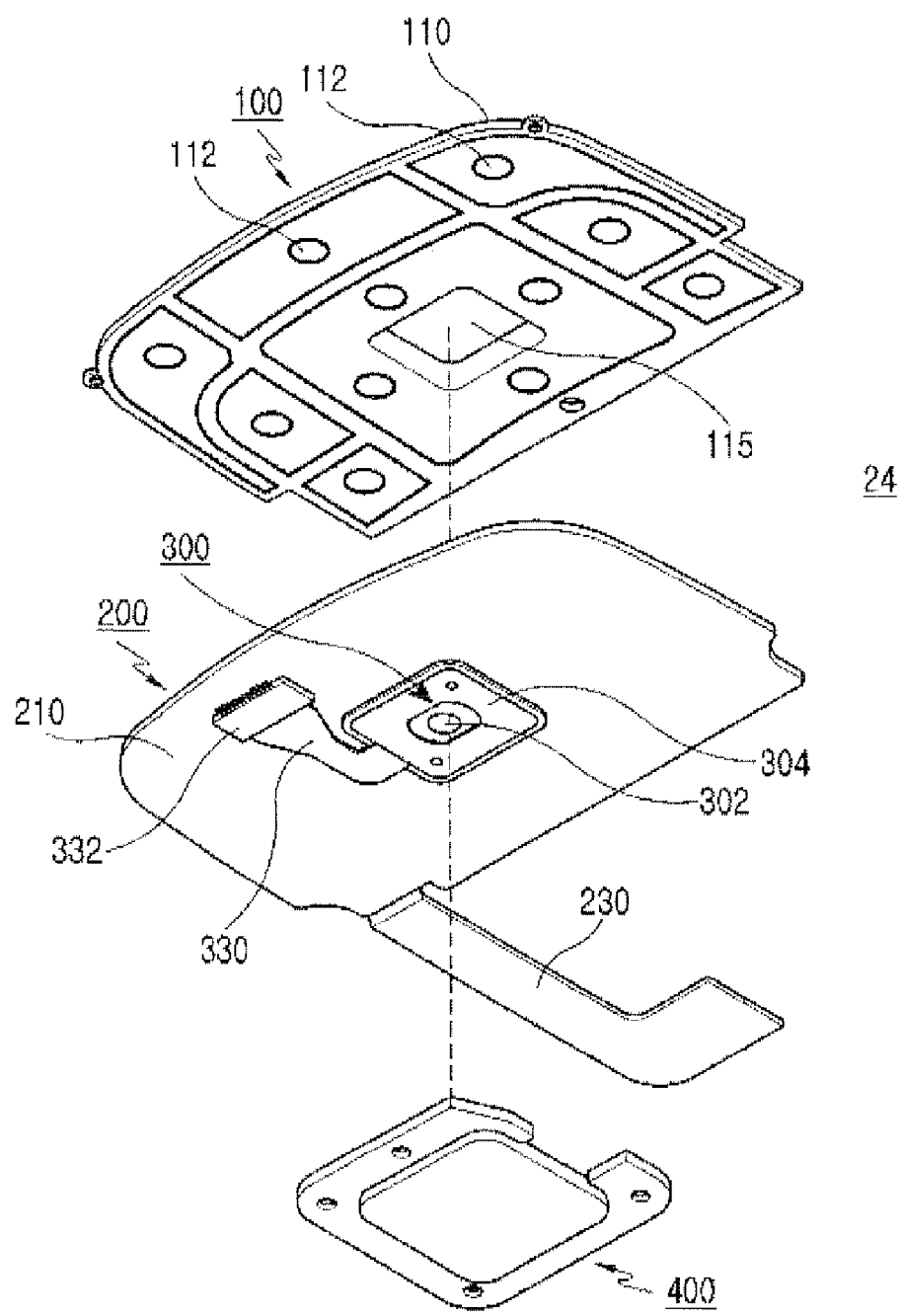
FIG. 5 is an exploded perspective view showing the configuration of a keypad assembly according to an exemplary embodiment of the present invention viewed from a bottom portion of the keypad assembly.
Figure 6:
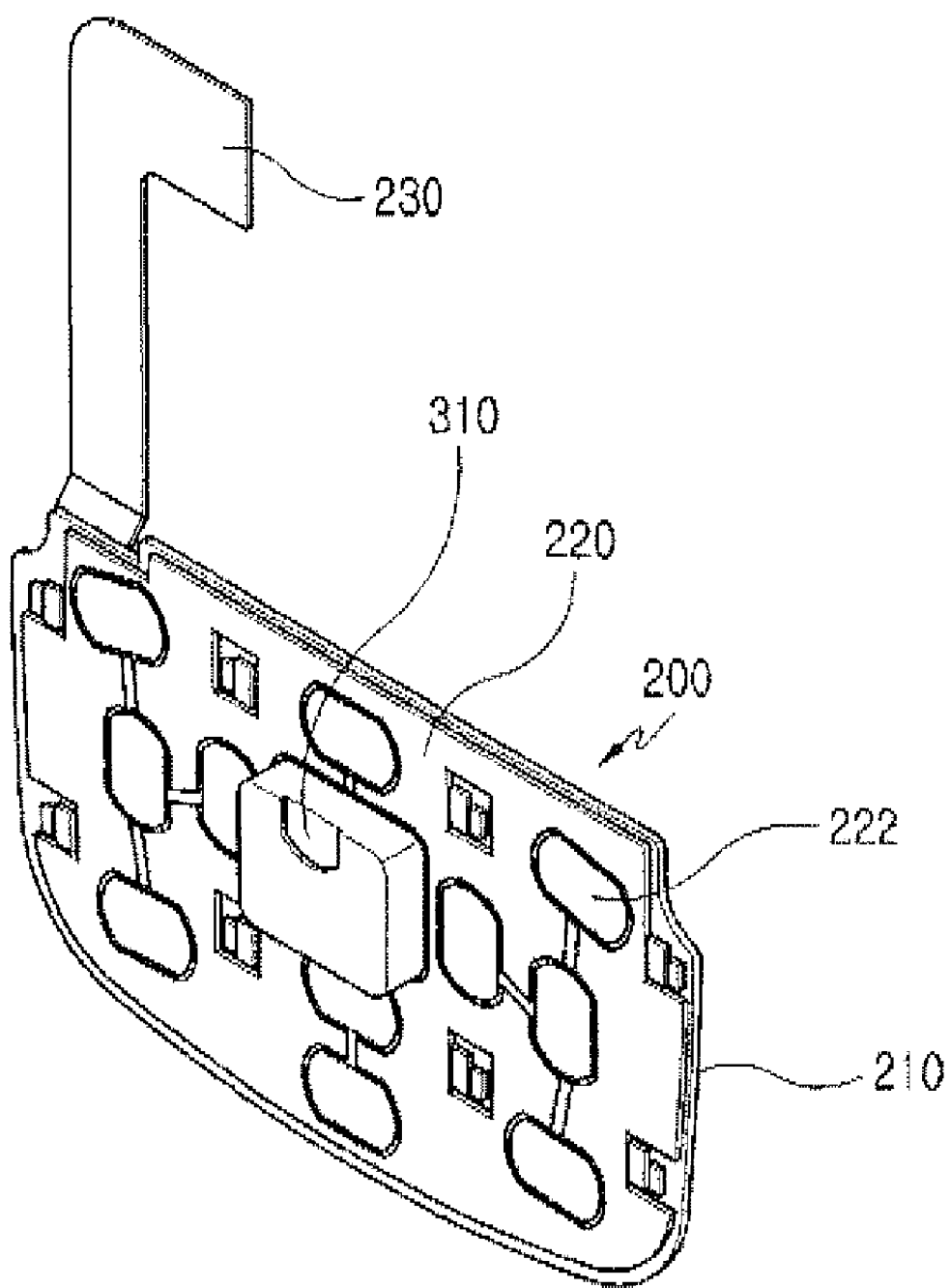
FIG. 6 is a perspective view showing the first and second substrates of the keypad assembly according to an exemplary embodiment of the present invention viewed from an upper portion of the keypad assembly.
Figure 7:
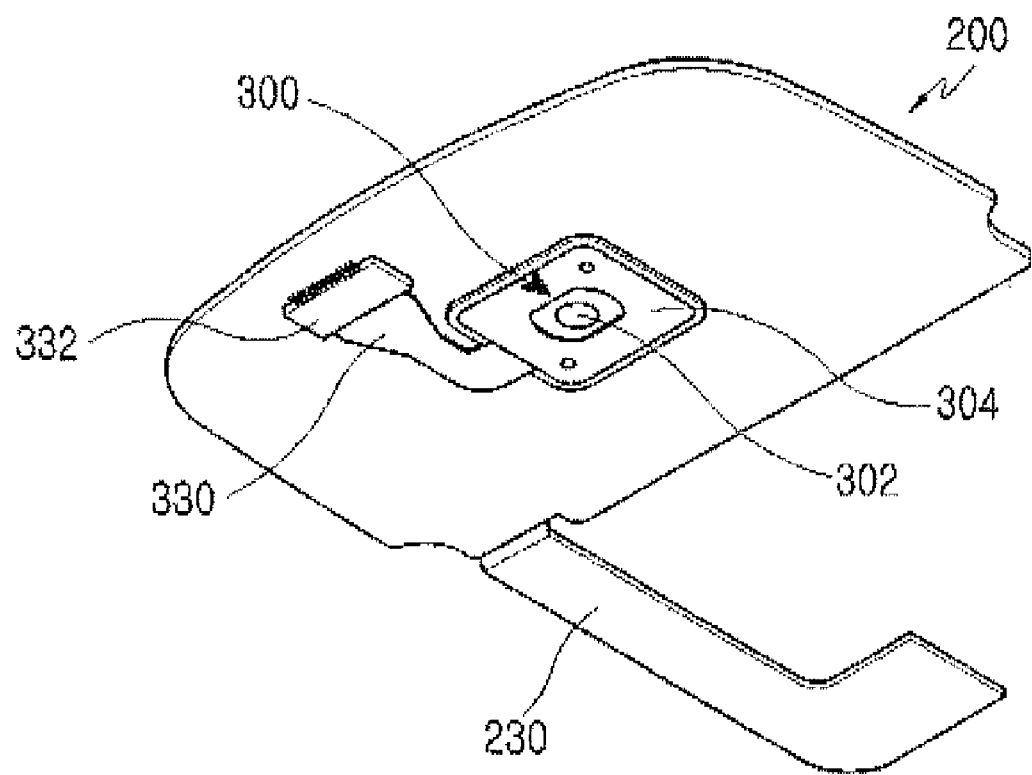
FIG. 7 is a perspective view showing the first and second substrates of the keypad assembly according to an exemplary embodiment of the present invention viewed from a bottom portion of the keypad assembly.

As shown in FIG. 5, FIG. 6, and FIG. 7, the second keypad assembly includes a second substrate 300, the stick 310, and a housing 400. The second substrate 300 is disposed on a lower surface of the first substrate 200 of the first keypad assembly, the stick 310 is disposed on the second substrate 300 and extends through the first and second openings 115 and 215, and the housing 400 is disposed on a lower surface of the second substrate 300 to substantially cover the second substrate 300. The second substrate 300 includes a second printed circuit board 304 and a single metal dome 302, which is disposed on the second printed circuit board 304. The single metal dome 302 protrudes downward. Further, the housing 400 includes a second actuator 410 that protrudes upward to face the single metal dome 302. The second printed circuit board 304 is electrically connected to the main board (not shown) through the second flexible circuit 330. Reference numeral 332 denotes a slim connector.

As shown in FIG. 8, when a user presses a key 120 downward (as indicated by the arrow), the first actuator 112 contacts the first metal dome 222, thereby causing input of a signal. Further, when an upper end of the stick 310 is pressed downward, the second actuator 410 contacts the single metal dome 302, thereby causing input of a signal. The first metal dome 222 and the single metal dome 302 protrude in opposite directions. Specifically, the first metal dome 222 convexly protrudes upward, while the single metal dome 302 convexly protrudes downward.

Further, the first actuator 112 protrudes downward to be substantially perpendicular to the lower surface of the flexible pad 110, and the second actuator 410 protrudes upward to be substantially perpendicular to the upper surface of the housing 400. Additionally, the stick 310 is mounted substantially perpendicularly and upward on the second printed circuit board 304. Consequently, the user may press the keys 120 or the stick 310 to input desired data.

Here, the stick 310 is an optical joystick module, which is integrated with the second printed circuit board 304 and may be easily used when menu is selected. As the optical joystick module is used as the stick 310, the signals caused by an optical operation and the force applied to the metal dome, are transmitted through the flexible circuit to a main board (not shown) in the body housing.

As described above, according to an exemplary embodiment of the present invention, the joystick key may be mounted in the keypad assembly so that it does not protrude above the keys of the keypad assembly, thereby improving the portability of the portable terminal and preventing joystick malfunction. Further, in the optical joystick module adapted to the keypad assembly according to an exemplary embodiment of the present invention, the desired key may be pressed so as to input a signal. Accordingly, the present invention allows data to be easily input in a multimedia environment.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A keypad assembly, comprising:
a first keypad assembly comprising a first substrate having a first opening; and
a second keypad assembly comprising a second substrate and a single stick, the single stick being disposed on the second substrate,
wherein the single stick extends through the first opening, and the second substrate contacts directly a lower surface of the first substrate,
wherein the second substrate comprises a second printed circuit board and a second metal dome disposed on a lower surface of the second printed circuit board, and
wherein the second metal dome convexly protrudes downward from the lower surface of the second printed circuit board.

2. The keypad assembly of claim 1, wherein the first keypad assembly further comprises a first keypad, the first substrate being arranged on the first keypad while facing the first keypad.

3. The keypad assembly of claim 2, wherein the first keypad comprises:
a flexible pad comprising a first actuator protruding from a lower surface of the flexible pad; and
a plurality of keys arranged on the flexible pad.

4. The keypad assembly of claim 2, wherein the first keypad comprises a second opening, the second opening having a shape corresponding to that of the first opening.

5. The keypad assembly of claim 2, wherein the single stick is substantially coplanar with the first keypad.

6. The keypad assembly of claim 1, wherein the first substrate comprises:
a first printed circuit board; and
a plurality of first metal domes arranged on the first printed circuit board.

7. The keypad assembly of claim 1, wherein the second keypad assembly further comprises a housing disposed on a lower surface of the second substrate so as to substantially cover the second substrate.

8. The keypad assembly of claim 7, wherein the housing comprises a second actuator protruding upward.

9. The keypad assembly of claim 1, wherein the single stick comprises an optical joystick module.

10. A keypad assembly for a portable terminal, comprising:
a first printed circuit board;
a plurality of first metal domes convexly protruding upward from an upper surface of the first printed circuit board;
a first keypad comprising a plurality of keys arranged on an upper surface of the first keypad, and a first actuator disposed on a lower surface of the first keypad while facing the first metal domes;
a second printed circuit board disposed on a lower surface of the first printed circuit board;
a second metal dome convexly protruding downward from a lower surface of the second printed circuit board;
a housing comprising a second actuator disposed on an upper surface of the housing so as to face the second metal dome, the housing being disposed on the first printed circuit board so as to substantially cover the second printed circuit board; and
a stick disposed on the second printed circuit board, the stick extending through the first printed circuit board to be adjacent to the keys.

11. The keypad assembly of claim 10, wherein the stick and the second actuator are coaxially disposed.

12. The keypad assembly of claim 10, wherein the stick comprises an optical joystick module.

13. The keypad assembly of claim 10, wherein the stick is extends substantially perpendicular to the second printed circuit board.

14. The keypad assembly of claim 10, wherein an upper surface of the stick is substantially coplanar with an upper surface of the keys.

15. The keypad assembly of claim 10, wherein the second printed circuit board is disposed directly on the lower surface of the first printed circuit board.

16. The keypad assembly of claim 10, wherein the second actuator and the second metal dome are disposed on a first side of the second printed circuit board, and the first printed circuit board is disposed on a second side of the second printed circuit board, the first side not being the same side as the second side.

17. The keypad assembly of claim 10, wherein the second printed circuit board is disposed between the second metal dome and the stick.

* * * * *